(12) United States Patent
Yanagisawa et al.

(10) Patent No.: US 8,406,617 B2
(45) Date of Patent: Mar. 26, 2013

(54) PHOTOGRAPHIC OPTICAL DEVICE

(75) Inventors: Katsushige Yanagisawa, Nagano (JP); Akihiro Nagata, Nagano (JP); Tadashi Takeda, Nagano (JP); Shinji Minamisawa, Nagano (JP); Yuichi Takei, Nagano (JP); Hisahiro Ishihara, Nagano (JP); Toshiyuki Karasawa, Nagano (JP); Kiyoshi Miyazaki, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/257,402

(22) PCT Filed: Apr. 8, 2010

(86) PCT No.: PCT/JP2010/002571
§ 371 (c)(1),
(2), (4) Date: Sep. 19, 2011

(87) PCT Pub. No.: WO2010/119649
PCT Pub. Date: Oct. 21, 2010

(65) Prior Publication Data
US 2012/0020654 A1    Jan. 26, 2012

(30) Foreign Application Priority Data
Apr. 15, 2009 (JP) ................................ 2009-098746

(51) Int. Cl.
*G03B 17/00* (2006.01)

(52) U.S. Cl. ........................................................ 396/55
(58) Field of Classification Search ................ 396/55
See application file for complete search history.

(56) References Cited

U.S. PATENT DOCUMENTS

| 8,279,289 B2 * | 10/2012 | Nagata et al. ............ 348/208.11 |
| 2007/0109412 A1 * | 5/2007 | Hara ............................ 348/207.1 |
| 2009/0052037 A1 * | 2/2009 | Wernersson .................. 359/554 |
| 2009/0303594 A1 * | 12/2009 | Lim et al. ...................... 359/554 |
| 2010/0080545 A1 * | 4/2010 | Fan et al. ......................... 396/55 |

FOREIGN PATENT DOCUMENTS

| JP | 2004-153503 A | 5/2004 |
| JP | 2007-310084 A | 11/2007 |
| JP | 2008-3130 A | 1/2008 |

OTHER PUBLICATIONS

International Search Report for International Application No. PCT/JP2010/002571 mailed Jul. 13, 2010 with English translation.

\* cited by examiner

*Primary Examiner* — Rodney Fuller
(74) *Attorney, Agent, or Firm* — Cantor Colburn LLP

(57) ABSTRACT

A photographic optical device may include a movable module having a camera module on which a lens and an imaging element are mounted, a support body, and a shake correction mechanism. The movable module may be provided with a sensor for detecting an inclination of the camera module and a cover member which structures an outer peripheral face of the movable module. The shake correction mechanism may be provided with a swing drive mechanism for swinging the movable module so that the optical axis is inclined. The swing drive mechanism may be provided with a drive magnet and a drive coil.

19 Claims, 5 Drawing Sheets

PHOTOGRAPHIC OPTICAL DEVICE

CROSS REFERENCE TO RELATED APPLICATIONS

This is a U.S. national stage of application No. PCT/JP2010/002571, filed on Apr. 8, 2010. Priority under 35 U.S.C. §119(a) and 35 U.S.C. §365(b) is claimed from Japanese Application No. 2009-098746, filed Apr. 15, 2009, the disclosure of which is also incorporated herein by reference.

TECHNICAL FIELD

The present invention relates to a photographic optical device provided with a shake correcting function in which a camera module having a lens and an imaging element is swung to correct a shake of hand.

BACKGROUND

In recent years, a photographic optical device is mounted on a portable device such as a cellular phone. When a portable device is used, a shake of hand may be easily occurred at the time of photographing. In order to prevent this problem, an optical device which is capable of correcting a shake of hand at the time of photographing has been proposed (see, for example, Patent Literature 1).

An optical device described in Patent Literature 1 is provided with a movable part on which a lens and an imaging element are mounted, a pivot shaft which is fixed to a base of the optical device and is abutted with a bottom face of the movable part, a plate spring which is fixed to the base and swingably supports the movable part, and a swing mechanism for swinging the movable part. In this optical device, the swing mechanism is structured of a drive coil and a drive magnet. Further, in this optical device, an X-axis gyro and a Y-axis gyro for detecting an inclination of the optical device are fixed to the base. The X-axis gyro detects an inclination of the base whose swing axis is directed in a direction parallel to an X-axis and the Y-axis gyro detects an inclination of the base whose swing axis is directed in a direction parallel to a Y-axis.

In the optical device described in Patent Literature 1, when an inclination of the base is detected by the X-axis gyro or the Y-axis gyro, the swing mechanism is driven. When the swing mechanism is driven, the movable part is swung with respect to the base by a driving force of the swing mechanism with a pivot shaft as a supporting point and a shake of hand is corrected.

[PTL 1] Japanese Patent Laid-Open No. 2007-310084

SUMMARY

As described above, in the optical device described in Patent Literature 1, when an inclination of the base is detected, the movable part is swung by a driving force of the swing mechanism and a shake of hand is corrected. In other words, in this optical device, although the inclination of the base is detected, the shake of hand is corrected by swinging the movable part and thus a detected object for an inclination and an object to be controlled at the time of correcting the shake of hand are different from each other. Therefore, in this optical device, a stable correction for a shake of hand may be difficult.

On the other hand, in recent years, in a market of a portable device such as a cellular phone, requirement for making a portable device thinner has been further increased and, as a result, requirement for making a photographic optical device which is mounted on the portable device thinner has been also increased.

In view of the problem described above, at least an embodiment of the present invention is to provides a photographic optical device which is capable of stably correcting a shake of hand and whose size is capable of being made thinner.

In order to solve the above problem, at least an embodiment of the present invention provides a photographic optical device including a movable module having a camera module on which a lens and an imaging element are mounted, a support body which supports the movable module, and a shake correction mechanism for correcting a shake of hand by swinging the movable module so that an optical axis of the camera module is inclined with respect to the support body. The movable module is provided with a sensor for detecting an inclination of the camera module and a cover member which structures an outer peripheral face of the movable module, and the cover member is provided with a side face part substantially parallel to the optical axis, and the sensor is disposed on an inner side or an outer side of the side face part.

In at least an embodiment of the photographic optical device, the movable module is provided with a sensor for detecting an inclination of the camera module and the movable module is swung by a shake correction mechanism to correct a shake of hand. In other words, an inclination of the camera module which structures the movable module is detected by a sensor which structures the movable module and the movable module is swung to correct a shake of hand. Therefore, a detected object of the inclination and a controlled object at the time of correcting a shake of hand are the same. Accordingly, a shake of hand is corrected stably.

Further, in at least an embodiment of the photographic optical device, the sensor is disposed on an inner side or an outer side of a side face part of a cover member which is substantially parallel to the optical axis. Therefore, even when the sensor is mounted on the movable module, the movable module is capable of being made relatively small in the optical axis direction of the camera module (in other words, being made thinner) and thus the photographic optical device can be made thinner.

In at least an embodiment of the present invention, for example, the shake correction mechanism is provided with a swing drive mechanism for swinging the movable module so that the optical axis is inclined, the swing drive mechanism is provided with a drive magnet and a drive coil which is oppositely disposed to the drive magnet, and the drive magnet or the drive coil is attached to an outer side face of the side face part.

In at least an embodiment of the present invention, for example, the cover member is formed in a substantially rectangular tube shape having two side face parts which are parallel to a first direction substantially perpendicular to an optical axis direction of the camera module and two side face parts which are parallel to a second direction substantially perpendicular to the optical axis direction and the first direction, and the sensor is disposed on the inner side or the outer side of the side face part so as to be capable of detecting an inclination of the camera module whose swing axis is directed to the first direction and an inclination of the camera module whose swing axis is directed to the second direction.

In at least an embodiment of the present invention, a case body which surrounds four sides of the cover member is provided, and the drive coil is attached to an inner side face of the case body and the drive magnet is attached to the outer side face of the side face part, and the sensor is disposed on the inner side of the side face part. According to this structure, the drive magnet is attached to the outer side face of the side face part of the cover member which structures the outer peripheral face of the movable module. Therefore, in comparison with a case that the drive coil is attached to an outer side face of the side face part of the cover member, electric power to the drive coil is not required to be supplied to the movable module and thus electric wiring can be simplified. Further, since the sensor is disposed on the inner side of the side face part, only the drive magnet is disposed on the outer side face of the side face part and thus a large drive magnet can be disposed and a sufficient drive force can be obtained.

In at least an embodiment of the present invention, it is preferable that the sensor is a one-axis gyro-sensor which is capable of detecting an inclination whose swing axis is directed in one direction, and the sensor is disposed on respective inner sides or outer sides of two of the side face parts so as to be capable of detecting an inclination of the camera module whose swing axis is directed in the first direction and an inclination of the camera module whose swing axis is directed in the second direction. According to this structure, in comparison with a case that the sensor is a two-axes gyro-sensor which is capable of detecting inclinations whose swing axes are directed in two directions perpendicular to each other, the structure of the sensor can be simplified. In this case, when the sensor is disposed on each of two side face parts adjacent to each other, drive forces of the swing drive mechanism for swinging the movable module can be easily balanced. Further, in this case, when the sensor is disposed on each of two side face parts which are parallel to each other, the movable module can be made relatively small in the direction parallel to the side face parts on which the sensor is disposed and, as a result, the photographic optical device can be made relatively small in the direction parallel to the side face parts on which the sensor is disposed.

Further, in at least an embodiment of the present invention, it may be structured that the sensor is a two-axes gyro-sensor which is capable of detecting inclinations whose swing axes are directed in two directions perpendicular to each other, and the sensor is disposed on an inner side or an outer side of one of the side face parts so as to be capable of detecting an inclination of the camera module whose swing axis is directed in the first direction and an inclination of the camera module whose swing axis is directed in the second direction. Further, in at least an embodiment of the present invention, it may be structured that the sensor is a three-axes gyro-sensor which is capable of detecting inclinations whose swing axes are directed in three directions perpendicular to each other, and the sensor is disposed on an inner side or an outer side of one of the side face parts so as to be capable of detecting an inclination of the camera module whose swing axis is directed in the first direction and an inclination of the camera module whose swing axis is directed in the second direction. According to this structure, in comparison with a case that a one-axis gyro-sensor is disposed on an inner side or an outer side of each of two side face parts, the size of the movable module can be made relatively small in the first direction and/or the second direction and, as a result, the size of the photographic optical device can be made relatively small in the first direction and/or the second direction.

In at least an embodiment of the present invention, it is preferable that the photographic optical device is provided with a circuit board on which the sensor is mounted, and the sensor is disposed between an inner side face of the side face part and an outer peripheral face of the camera module, and the circuit board is disposed along the inner side face of the side face part. According to this structure, in comparison with a case that the circuit board is disposed along an outer peripheral face of the camera module, a mounting area of the circuit board can be increased. Therefore, for example, a drive circuit and a control circuit for the swing drive mechanism for swinging the movable module can be mounted on the circuit board on which the sensor is mounted. Further, in a case that the circuit board is disposed along an outer peripheral face of the camera module, after the camera module has been attached to the cover member, wiring processing to the circuit board is required to be performed. However, in a case that the circuit board is disposed along the inner side face of the side face part, wiring processing to the camera module is not required and thus mounting operation of the camera module is simplified.

In at least an embodiment of the present invention, it is preferable that the shake correction mechanism is provided with a swing drive mechanism for swinging the movable module so that the optical axis is inclined and a drive circuit for driving the swing drive mechanism, and the cover member is formed of electrically conductive material, and the drive circuit is disposed between an inner side face of the side face part and an outer peripheral face of the camera module. According to this structure, a high frequency electromagnetic noise generated in the drive circuit at the time of correcting a shake of hand in the photographic optical device can be restrained from leaking to the outside of the cover member.

In at least an embodiment of the present invention, it is preferable that an opening part for inserting the camera module into an inside of the cover member is formed on one end side of the cover member in an optical axis direction of the camera module, and the movable module is provided with a second cover member which is formed of electrically conductive material and covers the opening part. According to this structure, even when an opening part for inserting the camera module into an inside of the cover member is formed in the cover member, a high frequency electromagnetic noise generated in the drive circuit at the time of correcting a shake of hand for the movable module can be effectively restrained from leaking to the outside of the cover member.

In at least an embodiment of the present invention, it is preferable that the drive circuit is electrically connected with the cover member and/or the second cover member which are grounded. According to this structure, in comparison with a case that the drive circuit is not electrically connected with the cover member and/or the second cover member which are grounded, a high frequency electromagnetic noise generated in the drive circuit can be further effectively restrained from leaking to the outside of the cover member. Further, generation of static electricity in the drive circuit can be restrained.

In at least an embodiment of the present invention, it is preferable that the shake correction mechanism is provided with a supporting point part which functions as a swing center of the movable module, and the supporting point part is disposed on an opposite-to-object side of the movable module, and the cover member is formed in a substantially rectangular tube-like shape having a bottom part on an object to be photographed side, and a chamfering part or a stepped part recessed toward an inner side of the cover member is formed at a boundary portion between the side face part of the cover member on which the sensor is disposed and the bottom part. An inclination angle of the optical axis of the camera module, which is required at the time of correcting a shake of hand, to the side face part side on which the sensor is disposed is commonly the same as an inclination angle of the optical axis of the camera module, which is required at the time of correcting the shake of hand, to the side face part side on which the sensor is not disposed, i.e., an opposite side to the side face part on which the sensor is disposed with respect to the optical axis. Therefore, in comparison with a case that a chamfering part or a stepped part is not formed at a boundary portion between the side face part on which the sensor is disposed and the bottom part, when a chamfering part or a stepped part is formed at the boundary portion between the side face part on which the sensor is disposed and the bottom part, a distance from a supporting point part to the boundary portion between the side face part on which the sensor is disposed and the bottom part can be shortened even when a distance from the supporting point part to the side face part on which the sensor is disposed is set to be longer by an amount of that the sensor is disposed than a distance from the supporting point part to the side face part on which the sensor is not disposed. Therefore, a swing amount of the boundary portion between the side face part on which the sensor is disposed and the bottom part which is required at the time of correcting a shake of hand can be made relatively small. Accordingly, a gap space for preventing an interference of the boundary portion between the side face part on which the sensor is disposed and the bottom part with other structure members can be made relatively small. As a result, the size of the photographic optical device can be made relatively small.

In at least an embodiment of the present invention, it is preferable that the shake correction mechanism is provided with the swing drive mechanism for swinging the movable module so that the optical axis is inclined and the supporting point part which functions as a swing center of the movable module, and the supporting point part is disposed between a center of an external shape of the movable module and the optical axis when viewed in the optical axis direction of the camera module. Further, in this case, the supporting point part is disposed at a position through which the optical axis is passed when viewed in the optical axis direction of the camera module. In a case that the movable module is formed so that the shape of the camera module when viewed in the optical axis direction is, for example, a substantially rectangular shape, as described above, an inclination angle of the optical axis of the camera module, which is required at the time of correcting a shake of hand, to the side face part side on which the sensor is disposed is the same as an inclination angle of the optical axis of the camera module, which is required at the time of correcting the shake of hand, to the side face part side on which the sensor is not disposed, i.e., an opposite side to the side face part on which the sensor is disposed with respect to the optical axis. Therefore, in a case that the supporting point part is disposed so that the supporting point part and the optical axis are coincided with each other when viewed in the optical axis direction of the camera module, an inclination angle of the movable module required at the time of correcting a shake of hand can be minimized.

As described above, a shake of hand can be corrected stably and the photographic optical device can be made relatively thin.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.
(Structure of Photographic Optical Device)

Figure 1:
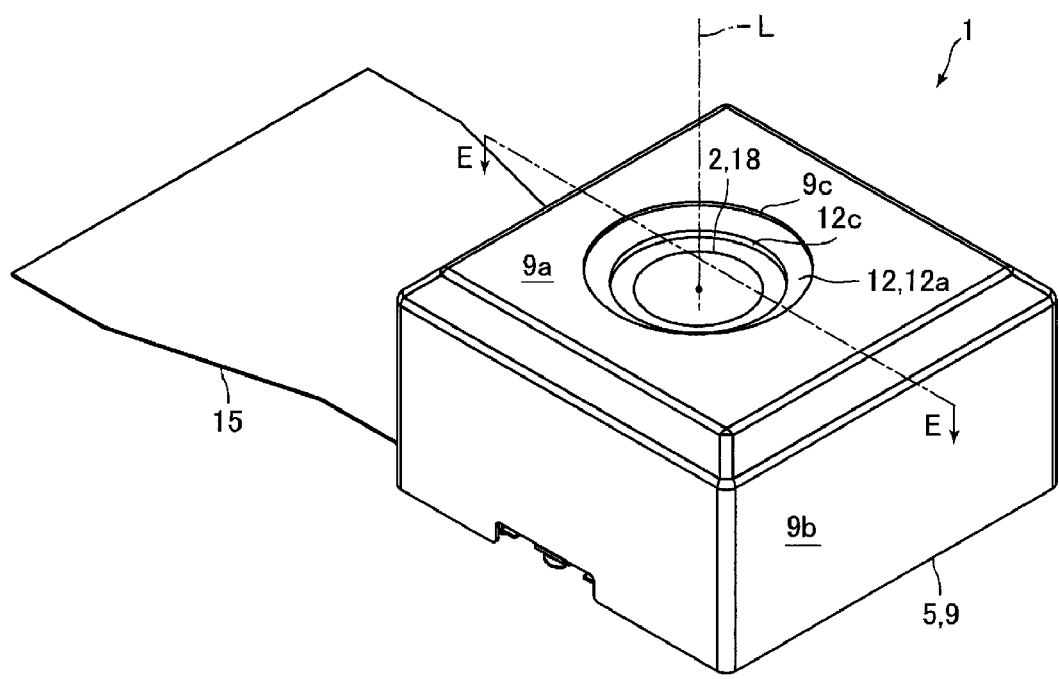
FIG. 1 is a perspective view showing a photographic optical device in accordance with an embodiment of the present invention.
Figure 1:
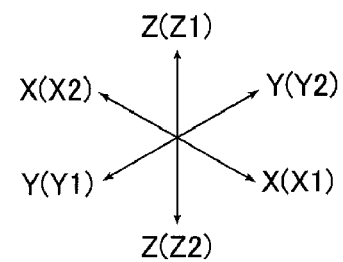
Figure 2:
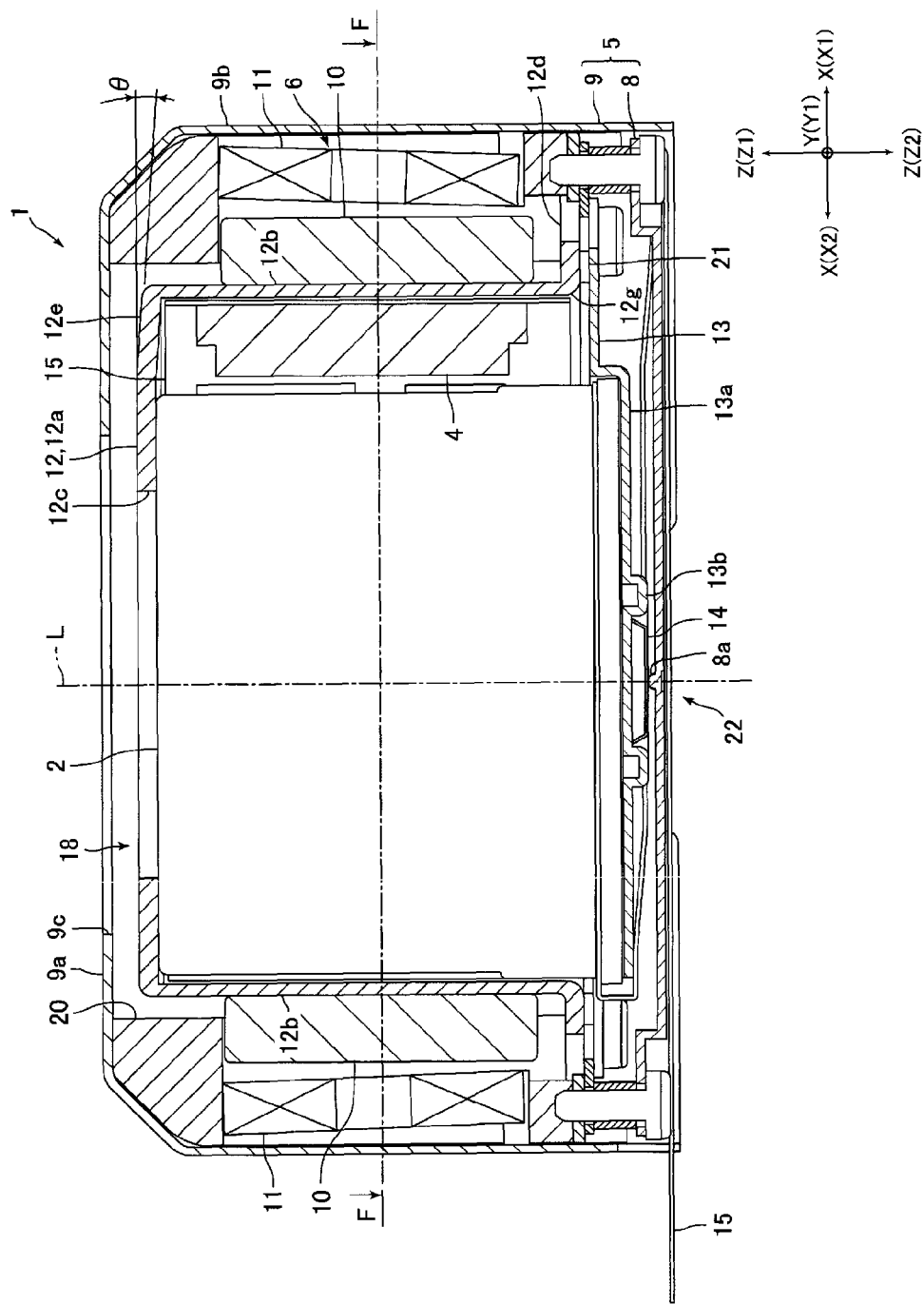
FIG. 2 is a cross-sectional view showing an "E-E" cross section in FIG. 1.
Figure 3:
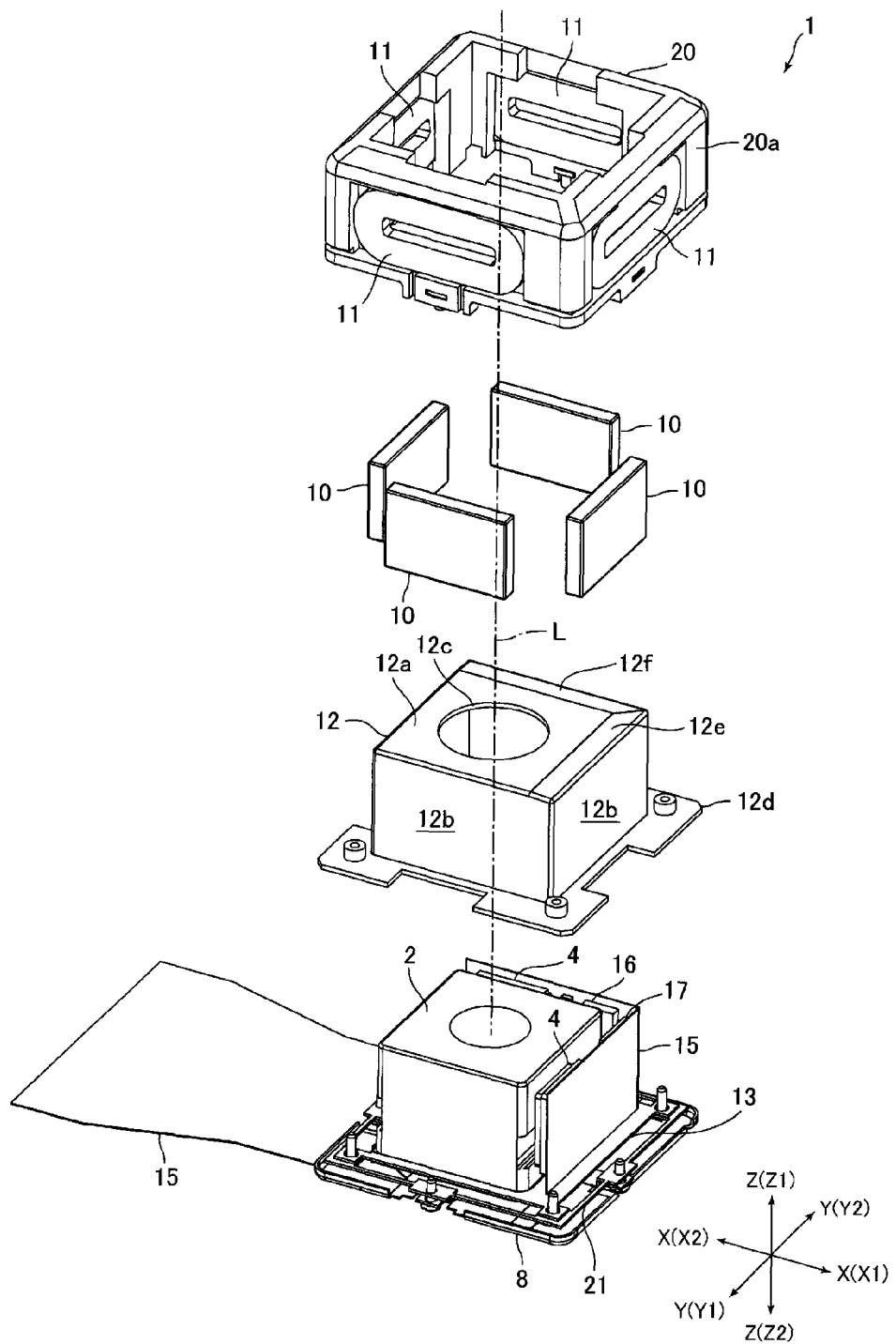
FIG. 3 is an exploded perspective view showing the photographic optical device in FIG. 1.
Figure 4:
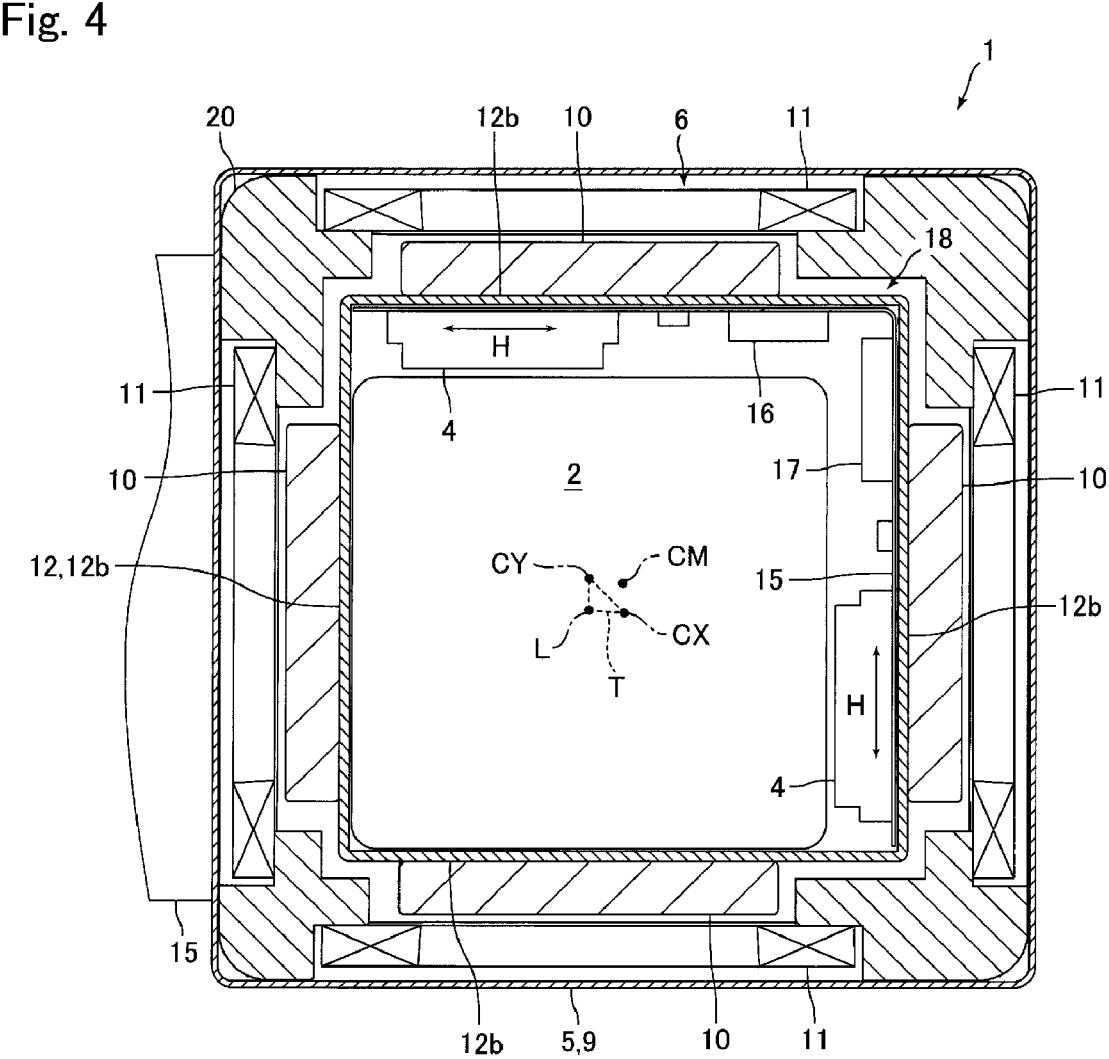
FIG. 4 is a cross-sectional view showing an "F-F" cross section in FIG. 2.
Figure 4:
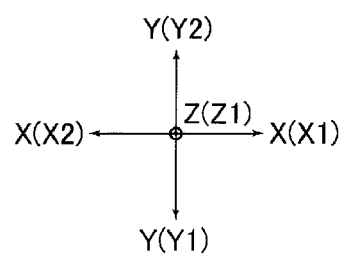

FIG. 1 is a perspective view showing a photographic optical device 1 in accordance with an embodiment of the present invention. FIG. 2 is a cross-sectional view showing an "E-E" cross section in FIG. 1. FIG. 3 is an exploded perspective view showing the photographic optical device 1 in FIG. 1. FIG. 4 is a cross-sectional view showing an "F-F" cross section in FIG. 2. In FIG. 3, a case body 9 is not shown.

In the following description, as shown in FIG. 1, three directions perpendicular to each other are set to be an "X" direction, a "Y" direction and a "Z" direction. Further, an "X1" direction side in FIG. 1 is referred to as a "right" side, an "X2" direction side is as a "left" side, a "Y1" direction side is as a "front" side, a "Y2" direction side is as a "rear" side, a "Z1" direction side is an "upper" side, and a "Z2" direction side is as a "lower" side. In this embodiment, the "Z" direction (upper and lower direction) is coincided with a direction (optical axis direction) of an optical axis "L" of the photographic optical device 1 when it is not swung. However, since a maximum swing angle of the photographic optical device 1 is very small (for example, about 2°), even when the photographic optical device 1 is swung, the upper and lower direction and the optical axis direction are substantially coincided with each other. In this embodiment, a right and left direction ("X" direction) is a first direction which is substantially perpendicular to the optical axis direction and a front and rear direction ("Y" direction) is a second direction which is substantially perpendicular to the optical axis direction and the right and left direction.

The photographic optical device 1 in this embodiment is a small and thin camera, which is mounted on a portable device such as a cellular phone, and is formed in a substantially rectangular prism-like shape as a whole. Specifically, the photographic optical device 1 is formed in a substantially rectangular prism-like shape whose shape viewed in the optical axis direction is a substantially square shape. Further, the photographic optical device 1 is formed in a substantially rectangular prism-like shape whose outer peripheral face is substantially parallel to the right and left direction or to the front and rear direction.

The photographic optical device 1 is, as shown in FIGS. 1 through 4, provided with a lens drive device 2 as a camera module on which a lens and an imaging element are mounted, two sensors 4 for detecting inclinations of the lens drive device 2, a support body 5 for supporting the lens drive device 2, and a swing drive mechanism 6 for swinging the lens drive device 2 so that an optical axis "L" of the lens drive device 2 is inclined. The support body 5 is provided with a base body 8 which structures an under face of the photographic optical device 1 and a case body 9 which structures the outer peripheral face in the front and rear direction and the right and left direction of the photographic optical device 1. Further, the swing drive mechanism 6 is provided with drive magnets 10 and drive coils 11 which are oppositely disposed to the drive magnets 10. The swing drive mechanism 6 in this embodiment is provided with four drive magnets 10 and four drive coils 11.

The lens drive device 2 is mounted with a lens and an imaging element as described above. Specifically, the lens is mounted on an upper end side of the lens drive device 2 and the imaging element is mounted on a lower end side of the lens drive device 2. Further, the lens drive device 2 is mounted with a lens drive mechanism for driving the lens in the optical axis direction. The lens drive mechanism is, for example, structured of a drive coil and a drive magnet.

In this embodiment, as described above, the imaging element is mounted on the lower end side of the lens drive device 2 and an object to be photographed which is disposed on an upper side of the lens drive device 2 is photographed. In other words, in this embodiment, the upper side ("Z1" direction side) is an object to be photographed side (object side) and a lower side ("Z2" direction side) is an opposite-to-object side (imaging element side).

The lens drive device 2 is formed in a substantially rectangular prism-like shape as a whole. Specifically, the lens drive device 2 is formed in a substantially rectangular prism-like shape whose shape when viewed in the optical axis direction is a substantially square shape. Further, the lens drive device 2 is disposed so that its outer peripheral face is substantially parallel to the right and left direction or the front and rear direction. Front and rear side faces and right and left side faces of the lens drive device 2 are covered by a cover member 12 and an under face of the lens drive device 2 is covered by a lower cover member 13 as a second cover member. The cover member 12 and the lower cover member 13 in this embodiment are formed of electrically conductive material. Further, the cover member 12 and the lower cover member 13 are formed of magnetic material. Specifically, the cover member 12 and the lower cover member 13 are formed of metal material having an electrically conductive property and a magnetic property. Further, the cover member 12 and/or the lower cover member 13 in this embodiment are grounded when the photographic optical device 1 is mounted on a portable device. In accordance with an embodiment of the present invention, the lower cover member 13 may be formed of nonmagnetic material.

The cover member 12 is formed in a roughly rectangular tube shape whose shape is a roughly square shape when viewed in the optical axis direction. Specifically, the cover member 12 is, as shown in FIG. 3, formed in a roughly rectangular bottomed tube shape which is provided with a bottom part 12a structuring an upper end part and four side face parts 12b substantially parallel to the optical axis "L". A lower end side of the cover member 12 is opened. Further, the cover member 12 is disposed so that two side face parts 12b parallel to each other are substantially parallel to the right and left direction and so that two other side face parts 12b parallel to each other are substantially parallel to the front and rear direction.

The bottom part 12a is formed with a circular through hole 12c through which the optical axis "L" is passed. A lower end of the cover member 12 is formed with a flange part 12d which is extended toward an outer side in the front and rear direction and an outer side in the right and left direction. Each outer side face of the four side face parts 12b is fixed with a drive magnet 10 as shown in FIG. 4.

As shown in FIG. 4, a relatively wide gap space, i.e., a sensor arrangement space is formed between a right side face of the lens drive device 2 and an inner side face of the side face part 12b disposed on the right side and between a rear face of the lens drive device 2 and an inner side face of the side face part 12b disposed on the rear side so that the sensor arrangement space is continuously formed through two side faces. On the other hand, a left side face of the lens drive device 2 and an inner side face of the side face part 12b disposed on the left side are closely disposed to each other, and a front side face of the lens drive device 2 and an inner side face of the side face part 12b disposed on the front side are closely disposed to each other.

As shown in FIGS. 2 and 3, a chamfering part 12e is formed at a boundary portion between the side face part 12b disposed on the right side and the bottom part 12a. In other words, a right end portion of the bottom part 12a is formed as the chamfering part 12e which is inclined to a lower side with a gradual angle θ toward the right side. The chamfering part 12e is, as shown in FIG. 3, formed in an entire region of the right end portion of the bottom part 12a in the front and rear direction. The angle θ is set at such an angle that the cover member 12 and other structure members are not contacted with each other even when a movable module 18 described below including the cover member 12 is swung with a supporting point part 22 described below as a supporting point.

Similarly, as shown in FIG. 3, a chamfering part 12f is formed at a boundary portion between the side face part 12b disposed on the rear side and the bottom part 12a. In other words, a rear end portion of the bottom part 12a is formed as the chamfering part 12f which is inclined to a lower side with a gradual angle θ toward the rear side. The chamfering part 12f is formed in an entire region of the rear end portion of the bottom part 12a in the right and left direction.

As described above, the lower end side of the cover member 12 is opened. In other words, the lower end side of the cover member 12 is formed with an opening part 12g (see FIG. 2). At the time of assembling of the photographic optical device 1, the lens drive device 2 is inserted into the inside of the cover member 12 through the opening part 12g. The lower cover member 13 is formed in a roughly square plate shape and is fixed to the flange part 12d so as to cover the opening part 12g of the cover member 12. The lower cover member 13 is, as shown in FIG. 2, is formed with an attaching part 13a to which the lens drive device 2 is attached so as to be recessed toward a lower side. Further, a ring-shaped recessed part 13b is formed at a center of the attaching part 13a in a ring shape with the optical axis "L" as a center and so as to be recessed toward the lower side. A projection abutting member 14 with which a supporting point projection 8a described below formed in the base body 8 is abutted is fixed to an under face of the lower cover member 13 on an inner side of the ring-shaped recessed part 13b.

Two sensors 4 are disposed on inner sides of the side face parts 12b of the cover member 12. In other words, two sensors 4 are disposed between inner side faces of the side face parts 12b and an outer peripheral face of the lens drive device 2. Specifically, one of the sensors 4 is disposed on a front end side in the gap space formed between the right side face of the lens drive device 2 and the inner side face of the side face part 12b disposed on the right side. The other of the sensors 4 is disposed on a left end side in the gap space formed between the rear side face of the lens drive device 2 and the inner side face of the side face part 12b disposed on the rear side. In other words, the sensors 4 are disposed on the respective inner sides of the side face part 12b disposed on the right side and the side face part 12b disposed on the rear side. Further, two sensors 4 are disposed in the gap space between the side face of the lens drive device 2 and the inner side face of the side face part 12b so as not to rattle in the gap space between the side face of the lens drive device 2 and the inner side face of the side face part 12b (in other words, so that the sensor 4 is moved so as to follow the lens drive device 2).

The sensor 4 is a gyro-sensor (angular velocity sensor). Specifically, the sensor 4 is a one-axis gyro-sensor which is capable of detecting an inclination whose swing axis is directed in one direction. Further, the sensor 4 is formed in a roughly flat plate shape. The sensor 4 in this embodiment is capable of detecting an inclination whose swing axis direction is a direction "H" that is perpendicular to a flattened direction (thickness direction) of the sensor 4 (see FIG. 4). The sensor 4 disposed on the inner side of the side face part 12*b* which is disposed on the right side is disposed so as to be capable of detecting an inclination whose swing axis direction is the front and rear direction ("Y" direction). Further, the sensor 4 disposed on the inner side of the side face part 12*b* which is disposed on the rear side is disposed so as to be capable of detecting an inclination whose swing axis direction is the right and left direction ("X" direction). In other words, in this embodiment, the inclination of the lens drive device 2 whose swing axis direction is the right and left direction and the inclination of the lens drive device 2 whose swing axis direction is the front and rear direction can be detected by the two sensors 4.

Two sensors 4 are mounted on a circuit board 15. The circuit board 15 in this embodiment is a flexible printed circuit board (FPC). The circuit board 15 is, as shown in FIG. 4, disposed along the inner side face of the side face part 12*b*. In other words, the circuit board 15 is extended along two inner side faces of the side face parts 12*b* by sticking one of the flat faces of the circuit board 15 to the inner side faces of the side face parts 12*b*, i.e., to the inner side face of the side face part 12*b* disposed on the right side and to the inner side face of the side face part 12*b* disposed on the rear side. Therefore, the circuit board 15 is disposed so that its flat face is directed in the optical axis direction, and the sensor which is disposed on the circuit board 15 is attached to the inner side face of the side face part 12*b*. The circuit board 15 is disposed so as to be extended on a lower end side of the photographic optical device 1 and, for example, is drawn out from a left side face of the photographic optical device 1.

The circuit board 15 is, in addition to two sensors 4, mounted with a driver IC (drive circuit) 16 for driving the swing drive mechanism 6 and a control IC (control circuit) 17 for controlling the swing drive mechanism 6. In this embodiment, as shown in FIG. 4, two sensors 4, the driver IC 16 and the control IC 17 are mounted on the same face of the circuit board 15, and the driver IC 16 and the control IC 17 are disposed between the inner side face of the side face part 12*b* and the outer peripheral face of the lens drive device 2. Specifically, the driver IC 16 is disposed on the right end side of the gap space which is formed between the rear side face of the lens drive device 2 and the inner side face of the side face part 12*b* disposed on the rear side. The control IC 17 is disposed on the rear end side of the gap space which is formed between the right side face of the lens drive device 2 and the inner side face of the side face part 12*b* disposed on the right side.

In this embodiment, the circuit board 15 is also mounted with an imaging element which is mounted on the lens drive device 2, and a regulator, a resistor, a capacitor and the like for driving and controlling the swing drive mechanism 6. Further, the driver IC 16 and the control IC 17 are electrically connected with the cover member 12 and/or the lower cover member 13 which are grounded when the photographic optical device 1 is mounted on a portable device. In other words, the circuit board 15 is formed with a grounding circuit pattern and the like for grounding the driver IC 16 and the control IC 17. The circuit board 15 is fixed to the cover member 12 or the lower cover member 13 with a screw or the like in a state that a portion where the grounding circuit pattern is formed is abutted with the cover member 12 or the lower cover member 13 and, as a result, the grounding circuit pattern is electrically connected with the cover member 12 or the lower cover member 13. Further, in this embodiment, the driver IC 16 and the control IC 17 are formed in a separated manner but the driver IC 16 and the control IC 17 may be formed in an integrated manner.

In this embodiment, the lens drive device 2, the sensor 4, the cover member 12, the lower cover member 13, the projection abutting member 14 and the like are swingably supported by the support body 5. In other words, in this embodiment, the lens drive device 2, the sensor 4, the cover member 12, the lower cover member 13, the projection abutting member 14 and the like structure a movable module 18 which is capable of swinging with respect to the support body 5. Further, in this embodiment, the cover member 12 structures an outer peripheral face of the movable module 18.

The support body 5 is provided with a coil holder 20 which holds drive coils 11 in addition to a base body 8 and a case body 9. The coil holder 20 is fixed with a plate spring 21 for swingably supporting the movable module 18.

The case body 9 is formed in a substantially rectangular tube shape whose shape viewed in the optical axis direction is a substantially square shape. Specifically, the case body 9 is formed in a substantially rectangular bottomed tube shape which is provided with a bottom part 9*a* structuring an upper end part and a tube part 9*b* substantially parallel to the optical axis "L". A lower end side of the case body 9 is opened. Further, the case body 9 is disposed so that four side face parts structuring the tube part 9*b* are substantially parallel to the right and left direction or the front and rear direction so as to surround four sides of the cover member 12. The bottom part 9*a* is formed with a circular through hole 9*c* through which the optical axis "L" is passed.

The base body 8 is formed in a substantially square plate shape and is fixed to the lower end side of the coil holder 20 so as to cover an opening part which is formed on the lower end side of the case body 9. A supporting point projection 8*a* formed in a substantially hemispheric shape which serves as a supporting point for swinging the movable module 18 is, as shown in FIG. 2, formed at a roughly center of the bottom part of the base body 8 so as to protrude to an upper side. The supporting point projection 8*a* is abutted with an under face of the projection abutting member 14. Further, the supporting point projection 8*a* is disposed so that the optical axis "L" is passed through its center.

In this embodiment, the supporting point projection 8*a* and the projection abutting member 14 structure the supporting point part 22 which serves as a swing center of the movable module 18 (swing center of the lens drive device 2). In other words, the supporting point part 22 which serves as the swing center of the movable module 18 is disposed on the lower side of the movable module 18. The supporting point part 22 is disposed at a position through which the optical axis "L" of the lens drive device 2 is passed.

The coil holder 20 is formed in a roughly rectangular tube shape whose shape viewed in the optical axis direction is a substantially square shape. Specifically, the coil holder 20 is formed in a roughly rectangular tube shape whose upper end and lower end are opened and which is provided with a tube part 20*a* that is substantially parallel to the optical axis "L". The coil holder 20 is fixed to the upper end side of the case body 9. Each of four side face parts which structure the tube part 20*a* is fixed with the drive coil 11. Further, four side face parts structuring the tube part 20*a* are disposed so as to be substantially parallel to the right and left direction or the front and rear direction. In other words, the drive coil 11 is attached to the inner side face of the case body 9 through the coil holder 20 which is fixed to the case body 9.

The plate spring 21 is formed in a roughly square shape as a whole. The plate spring 21 is provided with a holding part which holds the movable module 18, a fixed part which is fixed to the coil holder 20, and a spring part which connects the holding part with the fixing part. The holding part is fixed to the flange part 12d of the cover member 12 and the fixed part is fixed to a lower end side of the coil holder 20.

The drive magnet 10 is formed in a substantially rectangular plate shape. The drive magnet 10 is fixed to respective outer side faces of four side face parts 12b so as to face the drive coil 11 and is disposed in the inside of the case body 9. Especially, in two side face parts 12b, the sensor 4 is disposed on the inner side face of the side face part 12b through the circuit board 15 and the drive magnet 10 is disposed on the outer side face of the side face part 12b and thus, the sensor 4 and the drive magnet 10 are disposed on the inner side face and the outer side face of the side face part 12b so as to overlap with each other in a direction perpendicular to the side face part 12b. Further, the drive magnet 10 is swung together with the lens drive device 2. As described above, the cover member 12 is formed of magnetic material and the cover member 12 functions as a back yoke for the drive magnet 10.

In this embodiment, the drive magnets 10 that are fixed to the right and left side face parts 12b of the cover member 12 are magnetized so that a magnetic pole formed on the right face of the drive magnet 10 and a magnetic pole formed on its left face are different from each other. Similarly, the drive magnets 10 that are fixed to the front and rear side face parts 12b of the cover member 12 are magnetized so that a magnetic pole formed on the front face of the drive magnet 10 and a magnetic pole formed on its rear face are different from each other.

The drive coil 11 is an air-core coil structured by winding a fusion wire, which is provided with insulation coating that covers around a conducting wire and fusion coating that further covers around the insulation coating, in an air-core shape (in other words, a winding core such as a bobbin is not provided). The drive coil 11 is formed by winding the fusion wire in a roughly rectangular shape. Further, one piece of the drive coil 11 is fixed to each of four side face parts which structure the tube part 20a of the coil holder 20.

As shown in FIG. 2, the drive magnet 10 and the drive coil 11 are oppositely disposed to each other in a separated state with a predetermined gap space between them. Specifically, the drive magnet 10 and the drive coil 11 are oppositely disposed to each other with a predetermined gap space so that the drive magnet 10 and the drive coil 11 are not contacted with each other even when the movable module 18 is swung with the supporting point part 22 as a supporting point. In this embodiment, when an electric current is not supplied to the drive coils 11, as shown in FIG. 2, the movable module 18 is set at a neutral position where the movable module 18 is not inclined with respect to the support body 5.

In this embodiment, the drive magnet 10 and the drive coil 11 are oppositely disposed to each other in the right and left direction or the front and rear direction. A driving force for swinging the movable module 18 with the front and rear direction as a direction of the swing axis (in other words, for swinging the movable module 18 around the Y-axis) is generated by the drive magnet 10 and the drive coil 11 which are oppositely disposed to each other in the right and left direction. Further, a driving force for swinging the movable module 18 with the right and left direction as a direction of the swing axis (in other words, for swinging the movable module 18 around the X-axis) is generated by the drive magnet 10 and the drive coil 11 which are oppositely disposed to each other in the front and rear direction.

As described above, in this embodiment, a relatively wide gap space, i.e., a sensor arrangement space which is continuously formed along two faces is formed between the right side face of the lens drive device 2 and the inner side face of the side face part 12b disposed on the right side and between the rear face of the lens drive device 2 and the inner side face of the side face part 12b disposed on the rear side. Further, the left side face of the lens drive device 2 and the inner side face of the side face part 12b disposed on the left side are closely disposed to each other and the front side face of the lens drive device 2 and the inner side face of the side face part 12b disposed on the front side are closely disposed to each other. Specifically, two continuously formed inner side faces of the side face parts 12b and two side faces of the lens drive device 2 are abutted with each other or fixed to each other so as to have the gap space. Therefore, the lens drive device 2 and the cover member 12 are surely integrated with each other and the sensor arrangement space is surely secured.

Accordingly, as shown in FIG. 4, when viewed in the optical axis direction, the optical axis "L" of the lens drive device 2 and the center "CM" of the external shape (external shape center) of the movable module 18 are not coincided with each other and are displaced from each other. Further, in this embodiment, when viewed in the optical axis direction, the power center "CX" of drive forces by the drive magnets 10 and the drive coils 11 oppositely disposed to each other in the right and left direction, the power center "CY" of drive forces by the drive magnets 10 and the drive coils 11 oppositely disposed to each other in the front and rear direction, and the optical axis "L" of the lens drive device 2 are not coincided with each other and are displaced from each other. Further, in this embodiment, when viewed in the optical axis direction, the center "CM" of the movable module 18 is substantially coincided with the center of the photographic optical device 1.

In the photographic optical device 1 which is structured as described above, when a shake of hand is detected by the sensor 4, an electric current is supplied to the drive coil 11 based on a detection result by the sensor 4 and the movable module 18 is swung so as to incline the optical axis "L" with the supporting point part 22 as a swing center to correct the shake of hand.

In this embodiment, the supporting point part 22 comprised of the supporting point projection 8a and the projection abutting member 14, the swing drive mechanism 6, the driver IC 16, the control IC 17, the plate spring 21 and the like structure the shake correction mechanism by which the movable module 18 is swung so that the optical axis "L" of the lens drive device 2 is inclined with respect to the support body 5 (in other words, the lens drive device 2 is swung) to correct a shake of hand.

Principal Effects in this Embodiment

As described above, in this embodiment, an inclination of the lens drive device 2 structuring the movable module 18 is detected by the sensors 4 which structure the movable module 18 and the movable module 18 is swung based on detection results by the sensors 4 to correct the shake of hand. In other words, in this embodiment, an object whose inclination is to be detected and a controlled object at the time of correcting a shake of hand are the same object, i.e., the movable module 18. Therefore, in this embodiment, a shake of hand is stably corrected.

Further, in this embodiment, the sensor 4 is disposed on an inner side of the side face part 12*b* of the cover member 12 which is substantially parallel to the optical axis "L". Therefore, even when the sensor 4 is mounted on the movable module 18, the size in the optical axis direction of the movable module 18 is reduced (in other words, the movable module 18 is made thinner) and thus the photographic optical device 1 can be made thinner.

In this embodiment, the sensor 4 is disposed on the inner side of each of the side face part 12*b* disposed on the right side and the side face part 12*b* disposed on the rear side. In other words, the sensor 4 is disposed on each inner side of two side face parts 12*b* which are adjacent to each other. Therefore, in comparison with a case that the sensor 4 is disposed on each inner side of the side face parts 12*b* which are disposed on the right and left sides, or in comparison with a case that the sensor 4 is disposed on each inner side of the side face parts 12*b* which are disposed on the front and rear sides, drive forces by the drive magnets 10 and the drive coils 11 which are oppositely disposed to each other in the right and left direction are easily balanced with drive forces by the drive magnets 10 and the drive coil 11 which are oppositely disposed to each other in the front and rear direction.

In this embodiment, the case body 9 surrounding every side of the cover member 12 is provided. The drive coils 11 are attached to the inner side faces of the case body 9 and the drive magnets 10 are attached to the outer side faces of the side face parts 12*b* and the sensors 4 are disposed on the inner sides of the side face parts 12*b*. According to this structure, the drive magnet 10 is attached to the outer side face of the side face part 12*b* of the cover member 12 which structures the outer peripheral face of the movable module 18. Therefore, in comparison with a case that the drive coil 11 is attached to the outer side face of the side face part 12*b* of the cover member 12, a power for the drive coil 11 is not required to be supplied to the movable module 18 and thus an electric wiring can be simplified. Further, since the sensor 4 is disposed on the inner side of the side face part 12*b*, only the drive magnet 10 is disposed on the outer side face of the side face part 12*b*. Therefore, a large drive magnet 10 is disposed and thus a sufficient drive force can be obtained.

In this embodiment, the sensor 4 is a one-axis gyro-sensor which is capable of detecting an inclination whose swing axis is one direction. Therefore, for example, in comparison with a case that the sensor 4 is a two-axes gyro-sensor which is capable of detecting inclinations whose swing axes are perpendicular to each other, the structure of the sensor 4 can be simplified.

In this embodiment, the circuit board 15 is extended along the inner side face of the side face part 12*b* disposed on the right side and the inner side face of the side face part 12*b* disposed on the rear side. Therefore, in comparison with a case that the circuit board 15 is extended along the right side face and the rear side face of the lens drive device 2, a mounting area of the circuit board 15 can be increased. Accordingly, in addition to the sensors 4, the driver IC 16, control IC 17 and the like can be mounted on the same face of the circuit board 15. Further, in a case that the circuit board is disposed along an outer peripheral face of a camera module, after the camera module has been attached to the cover member, a wiring processing for the circuit board is required to be performed. However, in a case that the circuit board is disposed along the inner side face of the side face part, a wiring processing to the camera module is not required and thus a mounting operation of the camera module is simplified.

In this embodiment, the cover member 12 and the lower cover member 13 are formed of electrically conductive material. Further, the driver IC 16 is disposed between the inner side face of the side face part 12*b* and the outer peripheral face of the lens drive device 2. Therefore, when a shake of hand is to be corrected in the photographic optical device 1, a high frequency electromagnetic noise generated in the driver IC 16 is restrained from leaking to the outside of the cover member 12 and the lower cover member 13.

In this embodiment, the driver IC 16 and the control IC 17 are electrically connected through a grounding circuit pattern formed on the circuit board 15 with the cover member 12 and/or the lower cover member 13 which are grounded when the photographic optical device 1 is mounted on a portable device. In other words, the driver IC 16 and the control IC 17 are grounded through the grounding circuit pattern formed on the circuit board 15 and the cover member 12 and/or the lower cover member 13. Therefore, in a comparison with a case that the driver IC 16 and the control IC 17 are not electrically connected with the cover member 12 and/or the second cover member 13 which are to be grounded, a high frequency electromagnetic noise generated in the driver IC 16 is further effectively restrained from leaking to the outside of the cover member 12 and the second cover member 13. Further, generation of static electricity in the driver IC 16 and the control IC 17 is restrained.

An inclination angle of the optical axis "L" of the lens drive device 2 which is required at the time of correcting a shake of hand is commonly the same in each direction of the front and rear directions and the right and left directions. In this embodiment, a chamfering part 12*e* is formed at a boundary portion between the side face part 12*b* disposed on the right side and the bottom part 12*a*, and a chamfering part 12*f* is formed at a boundary portion between the side face part 12*b* disposed on the rear side and the bottom part 12*a*. In other words, the chamfering parts 12*e* and 12*f* are formed at the boundary portion between the side face parts 12*b* and the bottom part 12*a* where the sensors 4 are disposed on their inner sides. Therefore, in this embodiment, even when a distance from the supporting point part 22 to the side face part 12*b* on which the sensor 4 is disposed is set to be longer by an amount due to arrangement of the sensor 4 than a distance from the supporting point part 22 to the side face part 12*b* on which the sensor 4 is not disposed, a distance from the boundary portion between the side face part 12*b* on which the sensor 4 is disposed and the bottom part 12*a* to the supporting point part 22 is shortened in comparison with a case that the chamfering parts 12*e* and 12*f* are not formed at the boundary portion between the side face parts 12*b* on which the sensor 4 is disposed and the bottom part 12*a*. Therefore, in this embodiment, a swing amount of the boundary portion between the side face part 12*b* on which the sensor 4 is disposed and the bottom part 12*a* which is required at the time of correcting a shake of hand can be made relatively small and thus a gap space for preventing interference of the boundary portion between the side face part 12*b* on which the sensor 4 is disposed and the bottom part 12*a* with other structure members can be made relatively small. As a result, in this embodiment, the photographic optical device 1 can be made relatively small.

Further, in this embodiment, since the supporting point part 22 is disposed at the position through which the optical axis "L" is passed, an inclination angle of the movable module 18 which is required at the time of correcting a shake of hand can be minimized. In other words, an inclination angle of the optical axis "L" of the lens drive device 2 which is required at the time of correcting a shake of hand is commonly the same in each direction of the front and rear directions and the right and left directions. Therefore, when the supporting point part 22 is not disposed at the position through which the optical axis "L" is passed, an inclination angle of the movable module 18 required at the time of correcting a shake of hand in a certain direction is required to make larger than an inclination angle in another direction. However, this problem does not occur in this embodiment. Therefore, in this embodiment, an inclination angle of the movable module 18 required at the time of correcting a shake of hand can be minimized and, as a result, the size of the photographic optical device 1 can be reduced in the optical axis direction.

Other Embodiments

Although the present invention has been shown and described with reference to a specific embodiment, various changes and modifications will be apparent to those skilled in the art from the teachings herein.

Figure 5A:
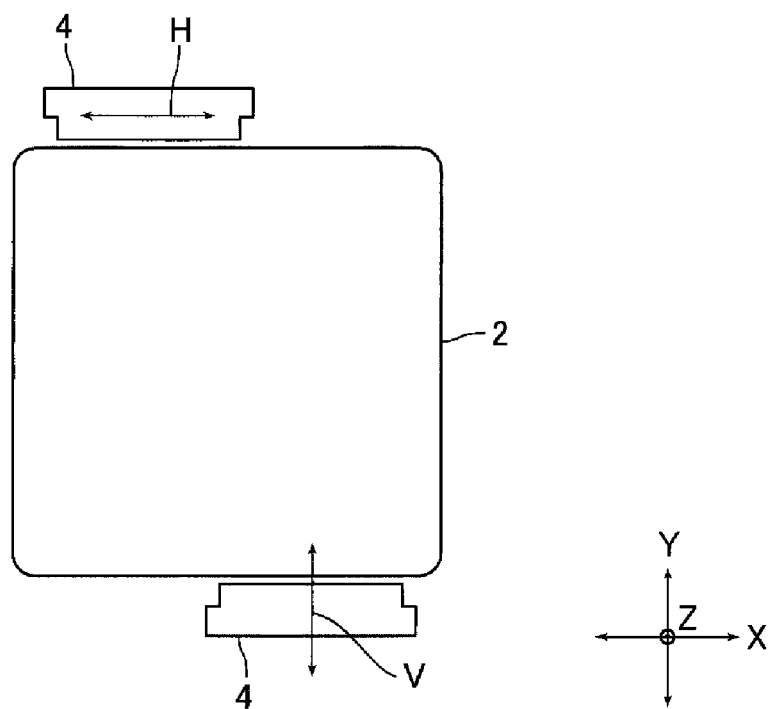
FIGS. 5(A) and 5(B) are explanatory views showing a sensor in accordance with another embodiment of the present invention.

In this embodiment, each of two sensors 4 can detect an inclination whose swing axis is directed in a direction "H" which is perpendicular to its thickness direction. However, the present invention is not limited to this embodiment. For example, as shown in FIG. 5(A), one of two sensors 4 may be capable of detecting an inclination whose swing axis is directed in its thickness direction "V". In this case, for example, the sensor 4 is disposed between the front side face of the lens drive device 2 and the inner side face of the side face part 12b disposed on the front side and between the rear side face of the lens drive device 2 and the inner side face of the side face part 12b disposed on the rear side. Further, in this case, for example, an inclination whose swing axis is directed in the front and rear direction is detected by the sensor 4 which is disposed on the inner side of the side face part 12b disposed on the front side, and an inclination whose swing axis is directed in the right and left direction is detected by the sensor 4 disposed on the inner side of the side face part 12b disposed on the rear side.

In this case, for example, a relatively wide gap space is formed between the front side face of the lens drive device 2 and the inner side face of the side face part 12b disposed on the front side, and between the rear side face of the lens drive device 2 and the inner side face of the side face part 12b disposed on the rear side. Further, the left side face of the lens drive device 2 and the inner side face of the side face part 12b disposed on the left side are closely disposed to each other and the right side face of the lens drive device 2 and the inner side face of the side face part 12b disposed on the right side are closely disposed to each other. Therefore, the movable module 18 can be made relatively small in the right and left direction and, as a result, the photographic optical device 1 can be made relatively small in the right and left direction.

Further, each of two sensors 4 may be capable of detecting an inclination whose swing axis is directed in the thickness direction "V". In this case, for example, the sensor 4 which is disposed on the inner side of the side face part 12b disposed on the right side is disposed so as to be capable of detecting an inclination whose swing axis is the right and left direction, and the sensor 4 which is disposed on the inner side of the side face part 12b disposed on the rear side is disposed so as to be capable of detecting an inclination whose swing axis is the front and rear direction.

Figure 5B:
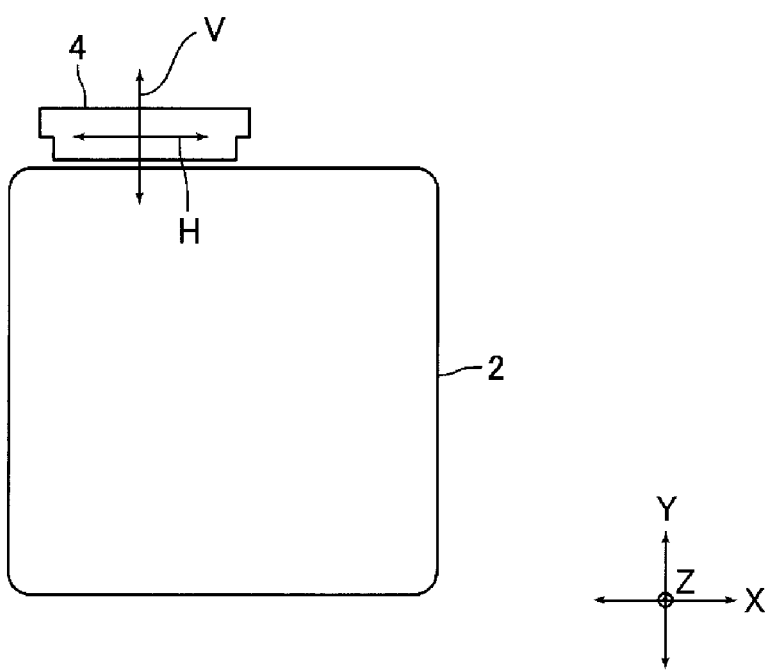

In the embodiment described above, the sensor 4 is a one-axis gyro-sensor which is capable of detecting an inclination whose swing axis is directed in one direction. However, the present invention is not limited to this embodiment. For example, the sensor 4 may be a two-axes gyro-sensor which is capable of detecting inclinations whose swing axes are directed in two directions which are perpendicular to each other. Specifically, as shown in FIG. 5(B), the sensor 4 may be a two-axes gyro-sensor which is capable of detecting an inclination whose swing axis is directed in the direction "H" perpendicular to the thickness direction and detecting an inclination whose swing axis is directed in the thickness direction "V". In this case, for example, one sensor 4 may be disposed between the rear side face of the lens drive device 2 and the inner side face of the side face part 12b disposed on the rear side. Therefore, in this case, in comparison with the embodiment described above, the movable module 18 can be made relatively small in the right and left direction. Further, the structure of the circuit board 15 can be simplified.

Further, the sensor 4 may be a three-axes gyro-sensor which is capable of detecting inclinations whose swing axes are three directions perpendicular to each other. Specifically, the sensor 4 may be a three-axes gyro-sensor which is capable of detecting an inclination whose swing axis is directed in the direction "H" perpendicular to the thickness direction, an inclination whose swing axis is directed in the thickness direction "V" and an inclination whose swing axis is directed in a direction which is perpendicular to the thickness direction "V" and perpendicular to the direction "H" perpendicular to the thickness direction. Also in this case, for example, one sensor 4 may be disposed between the rear side face of the lens drive device 2 and the inner side face of the side face part 12b disposed on the rear side. Therefore, in this case, in comparison with the embodiment described above, the movable module 18 can be made relatively small in the right and left direction. Further, the structure of the circuit board 15 can be simplified. Further, in this case, an inclination whose swing axis is directed in the upper and lower direction ("Z" direction) is not required to be detected.

Further, even when the sensor 4 is a two-axes gyro-sensor or a three-axes gyro-sensor, the sensor 4 may be disposed on each inner side of two side face parts 12b. Further, in a case that the sensor 4 is a two-axes gyro-sensor or a three-axes gyro-sensor and, when the sensor 4 is disposed on the inner side of one side face part 12b, it is preferable that the sensor 4 is disposed on the inner side of the side face part 12b which is perpendicular to a direction in which a shake of hand is frequently occurred in the photographic optical device 1. For example, when a shake of hand in the front and rear direction is frequently occurred in the photographic optical device 1 (in other words, when an inclination whose swing axis is directed in the right and left direction is frequently occurred), it is preferable that the sensor 4 is disposed on the inner side of the side face part 12b disposed on the rear side (or the front side). In this case, a distance between the drive magnet 10 fixed to the side face part 12b on which the sensor 4 is disposed and the supporting point part 22 can be relatively increased in the direction in which a shake of hand is frequently occurred and thus a drive force of the swing drive mechanism 6 can be increased in the direction in which correction is performed frequently.

In the embodiment described above, the circuit board 15 is extended along the inner side face of the side face part 12b disposed on the right side and the inner side face of the side face part 12b disposed on the rear side. However, the present invention is not limited to this embodiment. For example, the circuit board 15 may be extended along the right side face and the rear side face of the lens drive device 2. Further, in the embodiment described above, the sensor 4 is disposed on the inner side of the side face part 12b but the sensor 4 may be disposed on the outer side of the side face part 12b. For example, the sensor 4 may be mounted on a circuit board 15 which is disposed along an outer side face of the side face part 12b.

In the embodiment described above, the chamfering part 12e is formed at the boundary portion between the side face part 12b disposed on the right side and the bottom part 12a, and the chamfering part 12f is formed at the boundary portion between the side face part 12b disposed on the rear side and the bottom part 12a. However, the present invention is not limited to this embodiment. For example, instead of providing the chamfering parts 12e and 12f, a stepped part which is recessed toward the inner side of the cover member 12 may be formed at the boundary portion between the side face part 12b disposed on the right side and the bottom part 12a and the boundary portion between the side face part 12b disposed on the rear side and the bottom part 12a.

In the embodiment described above, the drive magnets 10 having the same shape are fixed to the respective outer side faces of four side face parts 12b. However, the present invention is not limited to this embodiment. For example, a thickness of the drive magnet 10 fixed to the outer side face of the side face part 12b on the inner side of which the sensor 4 is disposed may be made thinner than a thickness of the drive magnet 10 fixed to the outer side face of the side face part 12b on the inner side of which the sensor 4 is not disposed. In this case, the photographic optical device 1 can be made relatively small in the right and left direction and the front and rear direction. Further, in this case, the power center "CX" between the drive magnets 10 and the drive coils 11 which are oppositely disposed in the right and left direction when viewed in the optical axis direction can be coincided with the optical axis "L", and the power center "CY" between the drive magnets 10 and the drive coils 11 which are oppositely disposed in the front and rear direction can be coincided with the optical axis "L".

In the embodiment described above, the camera module on which a lens and an imaging element are mounted is the lens drive device 2 on which a lens drive mechanism for driving the lens in the optical axis direction is further mounted. However, the present invention is not limited to this embodiment. For example, the camera module on which a lens and an imaging element are mounted is not required to mount with the lens drive mechanism.

In the embodiment described above, the drive magnet 10 is fixed to the side face part 12b of the cover member 12 and the drive coil 11 is fixed to the case body 9 through the coil holder 20. However, the present invention is not limited to this embodiment. For example, it may be structured that the drive coils 11 are fixed to the side face parts 12b of the cover member 12 and the drive magnets 10 are fixed to the case body 9 directly or through a predetermined attaching member.

In the embodiment described above, the drive coil 11 is attached to the inner side face of the case body 9 through the coil holder 20 which is fixed to the case body 9. However, the drive coil may be directly attached to the inner side face of the case body 9 without using the coil holder 20.

In the embodiment described above, the supporting point part 22 is disposed at the position through which the optical axis "L" is passed. However, the present invention is not limited to this embodiment. For example, the supporting point part 22 may be disposed between the center "CM" of the external shape of the movable module 18 and the optical axis "L" when viewed in the optical axis direction. In other words, the supporting point part 22 may be disposed on a virtual line or in the vicinity of the virtual line which connects the center "CM" of the external shape with the optical axis "L" when viewed in the optical axis direction. Further, the supporting point part 22 may be disposed, when viewed in the optical axis direction, within a virtual triangle "T" (see FIG. 4) which is formed by connecting the power center "CX" of the drive magnets 10 and the drive coils 11 oppositely disposed to each other in the right and left direction, the power center "CY" of the drive magnets 10 and the drive coils 11 oppositely disposed to each other in the front and rear direction, and the optical axis "L" with each other. When the supporting point part 22 is disposed at the position through which the optical axis "L" is passed as described above, an inclination angle of the movable module 18 which is required at the time of correcting a shake of hand can be minimized. On the other hand, when the power centers "CX" and "CY" and the supporting point part 22 are coincided with each other when viewed in the optical axis direction, power of the swing drive mechanism 6 which is required at the time of correcting a shake of hand can be minimized. Therefore, according to this structure, power of the swing drive mechanism 6 can be made relatively small while an inclination angle of the movable module 18 which is required at the time of correcting a shake of hand is made relatively small.

In the embodiment described above, the circuit board 15 on which the sensor 4 is mounted is an FPC having flexibility but the circuit board on which the sensor 4 is mounted may be a circuit board having high rigidity which is formed of glass epoxy material or the like. Further, in the embodiment described above, the driver IC 16 and the control IC 17 are mounted on the circuit board 15 on which the sensor 4 is mounted. However, the circuit board 15 on which the sensor 4 is mounted and a circuit board on which the driver IC 16 and the control IC 17 are mounted may be provided separately.

In the embodiment described above, the lens drive device 2 is formed in a roughly rectangular prism-like shape. However, the lens drive device 2 may be formed in a roughly polygonal prism-like shape other than a roughly rectangular prism-like shape or in a roughly cylindrical shape. Further, in the embodiment described above, the cover member 12 is formed in a roughly rectangular tube shape but the cover member 12 may be formed in a roughly polygonal tube shape other than a roughly rectangular tube shape or in a roughly cylindrical tube shape.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A photographic optical device comprising:
   a movable module having a camera module on which a lens and an imaging element are mounted;
   a support body which supports the movable module; and
   a shake correction mechanism for correcting a shake of hand by swinging the movable module so that an optical axis of the camera module is inclined with respect to the support body;
   wherein the movable module is provided with a sensor for detecting an inclination of the camera module and a cover member which structures an outer peripheral face of the movable module;
   wherein the cover member is provided with a side face part substantially parallel to the optical axis;

wherein the shake correction mechanism is provided with a swing drive mechanism for swinging the movable module so that the optical axis is inclined, wherein the swing drive mechanism is provided with a drive magnet and a drive coil which is oppositely disposed to the drive magnet, wherein the sensor is disposed on an inner side of the side face part; and wherein the drive magnet or the drive coil is attached to an outer side face of the side face part.

2. The photographic optical device according to claim 1, wherein the cover member is formed in a substantially rectangular tube shape having two side face parts which are parallel to a first direction substantially perpendicular to an optical axis direction of the camera module and two side face parts which are parallel to a second direction substantially perpendicular to the optical axis direction and the first direction, and the sensor is disposed on the inner side of the side face part so as to be capable of detecting an inclination of the camera module whose swing axis is the first direction and an inclination of the camera module whose swing axis is the second direction.

3. The photographic optical device according to claim 2, further comprising a case body which surrounds four sides of the cover member, wherein the drive coil is attached to an inner side face of the case body and the drive magnet is attached to the outer side face of the side face part.

4. The photographic optical device according to claim 3, wherein the sensor is a one-axis gyro-sensor which is capable of detecting an inclination whose swing axis is directed in one direction, and the sensor is disposed on respective inner sides two of the side face parts so as to be capable of detecting an inclination of the camera module whose swing axis is directed in the first direction and an inclination of the camera module whose swing axis is directed in the second direction.

5. The photographic optical device according to claim 3, wherein the sensor is a two-axes gyro-sensor which is capable of detecting inclinations whose swing axes are directed in two directions perpendicular to each other, and the sensor is disposed on an inner side of one of the side face parts so as to be capable of detecting an inclination of the camera module whose swing axis is directed in the first direction and an inclination of the camera module whose swing axis is directed in the second direction.

6. The photographic optical device according to claim 3, wherein the sensor is a three-axes gyro-sensor which is capable of detecting inclinations whose swing axes are directed in three directions perpendicular to each other, and the sensor is disposed on an inner side of one of the side face parts so as to be capable of detecting an inclination of the camera module whose swing axis is directed in the first direction and an inclination of the camera module whose swing axis is directed in the second direction.

7. The photographic optical device according to claim 1, further comprising a circuit board on which the sensor is mounted, wherein the sensor is disposed between an inner side face of the side face part and an outer peripheral face of the camera module, and wherein the circuit board is disposed along the inner side face of the side face part.

8. The photographic optical device according to claim 7, wherein the shake correction mechanism is provided with a swing drive mechanism for swinging the movable module so that the optical axis is inclined and a drive circuit for driving the swing drive mechanism, the cover member is formed of electrically conductive material, and the drive circuit is disposed between the inner side face of the side face part and the outer peripheral face of the camera module.

9. The photographic optical device according to claim 8, further comprising an opening part which is formed on one end side of the cover member in an optical axis direction of the camera module for inserting the camera module into an inside of the cover member, wherein the movable module is provided with a second cover member which is formed of electrically conductive material and covers the opening part.

10. The photographic optical device according to claim 9, wherein the drive circuit is electrically connected with the cover member and/or the second cover member which are to be grounded.

11. The photographic optical device according to claim 1, wherein the shake correction mechanism is provided with a supporting point part which functions as a swing center of the movable module, the supporting point part is disposed on an opposite-to-object side of the movable module, the cover member is formed in a substantially rectangular tube-like shape having a bottom part on an object to be photographed side, and a chamfering part or a stepped part recessed toward an inner side of the cover member is formed at a boundary portion between the side face part of the cover member on which the sensor is disposed and the bottom part.

12. The photographic optical device according to claim 11, wherein the shake correction mechanism is provided with the swing drive mechanism for swinging the movable module so that the optical axis is inclined and the supporting point part which functions as a swing center of the movable module, and the supporting point part is disposed between a center of an external shape of the movable module and the optical axis when viewed in the optical axis direction of the camera module.

13. The photographic optical device according to claim 11, wherein the shake correction mechanism is provided with the swing drive mechanism for swinging the movable module so that the optical axis is inclined and the supporting point part which functions as a swing center of the movable module; and the supporting point part is disposed at a position through which the optical axis is passed when viewed in the optical axis direction of the camera module.

14. The photographic optical device according to claim 11, wherein the cover member is formed in a substantially rectangular tube shape having two side face parts which are parallel to a first direction substantially perpendicular to an optical axis direction of the camera module and two side face parts which are parallel to a second direction substantially perpendicular to the optical axis direction and the first direction, and the sensor is disposed on the inner side of the side face part so as to be capable of detecting an inclination of the camera module whose swing axis is the first direction and an inclination of the camera module whose swing axis is the second direction.

15. The photographic optical device according to claim 14, further comprising a case body which surrounds four sides of the cover member, wherein the drive coil is attached to an inner side face of the case body and the drive magnet is attached to the outer side face of the side face part.

16. The photographic optical device according to claim 14, wherein the sensor is a two-axes gyro-sensor which is capable of detecting inclinations whose swing axes are directed in two directions perpendicular to each other, and the sensor is disposed on an inner side of one of the side face parts so as to be capable of detecting an inclination of the camera module whose swing axis is directed in the first direction and an inclination of the camera module whose swing axis is directed in the second direction.

17. The photographic optical device according to claim 1, wherein the shake correction mechanism is provided with a swing drive mechanism for swinging the movable module so that the optical axis is inclined and a drive circuit for driving the swing drive mechanism, the cover member is formed of electrically conductive material, and the drive circuit is disposed between an inner side face of the side face part and an outer peripheral face of the camera module.

18. The photographic optical device according to claim 17, further comprising an opening part which is formed on one end side of the cover member in an optical axis direction of the camera module for inserting the camera module into an inside of the cover member, wherein the movable module is provided with a second cover member which is formed of electrically conductive material and covers the opening part.

19. The photographic optical device according to claim 18, wherein the drive circuit is electrically connected with the cover member and/or the second cover member which are to be grounded.

* * * * *